US009274589B2

(12) United States Patent
Park

(10) Patent No.: US 9,274,589 B2
(45) Date of Patent: Mar. 1, 2016

(54) TOUCH SENSING SYSTEM AND METHOD FOR PROVIDING PROXIMITY SENSING FUNCTION USING TOUCH SCREEN PANEL

(71) Applicant: Melfas Inc., Seoul (KR)

(72) Inventor: Young Ju Park, Seoul (KR)

(73) Assignee: Melfas Inc., Seoul (KR)

( * ) Notice: Subject to any disclaimer, the term of this patent is extended or adjusted under 35 U.S.C. 154(b) by 53 days.

(21) Appl. No.: 14/174,603

(22) Filed: Feb. 6, 2014

(65) Prior Publication Data
US 2015/0185958 A1 Jul. 2, 2015

(30) Foreign Application Priority Data

Dec. 26, 2013 (KR) .................... 10-2013-0164084

(51) Int. Cl.
*G06F 1/32* (2006.01)
*G06F 3/041* (2006.01)

(52) U.S. Cl.
CPC ............ *G06F 1/3265* (2013.01); *G06F 3/0416* (2013.01); *G06F 2203/04108* (2013.01)

(58) Field of Classification Search
CPC ..... G06F 3/041; G06F 3/0412; G06F 3/0416; G06F 3/044; G06F 3/0421; G06F 3/0488; G06F 3/04886; G06F 2203/04108; G06F 1/3265
USPC ........................................ 345/173, 174, 175
See application file for complete search history.

(56) References Cited

U.S. PATENT DOCUMENTS

| 8,134,536 | B2 * | 3/2012 | Hsu ..................... G06F 3/0416 345/173 |
| 8,564,545 | B2 * | 10/2013 | Chen .................... G06F 3/0416 345/173 |
| 8,750,852 | B2 * | 6/2014 | Forutanpour et al. ......... 455/418 |
| 2009/0288889 | A1 * | 11/2009 | Carlvik et al. ............. 178/18.03 |
| 2010/0099462 | A1 * | 4/2010 | Baek et al. .................... 455/566 |
| 2010/0182248 | A1 * | 7/2010 | Chun ............................ 345/173 |
| 2010/0302179 | A1 * | 12/2010 | Ahn et al. ..................... 345/173 |
| 2010/0315358 | A1 * | 12/2010 | Chang et al. .................. 345/173 |
| 2011/0298732 | A1 * | 12/2011 | Yoshimoto et al. ........... 345/173 |

(Continued)

FOREIGN PATENT DOCUMENTS

KR   10-2011-0002613 A   1/2011
KR   10-2011-0047595 A   5/2011

(Continued)

OTHER PUBLICATIONS

Korean Intellectual Property Office, Office Action, Korean Patent Application No. 10-2013-0164084, Mar. 12, 2015, five pages [with concise explanation of relevancy in English].

*Primary Examiner* — Tom Sheng
(74) *Attorney, Agent, or Firm* — Fenwick & West LLP

(57) ABSTRACT

Provided is a touch sensing system and method for providing a proximity sensing function using a touch screen panel. The touch sensing system may include at least one storage unit including at least one program, a touch screen configured to detect a touch of an object, and at least one processor configured to activate a proximity sensing function on the touch screen according to a control of the at least one program, to detect proximity of the object based on sensing information of a proximity sensing area predetermined on a partial area of the touch screen, and to process a predetermined operation in response to detecting the proximity of the object.

12 Claims, 9 Drawing Sheets

(56) References Cited

U.S. PATENT DOCUMENTS

| | | | |
|---|---|---|---|
| 2011/0310459 A1* | 12/2011 | Gates et al. | 359/296 |
| 2011/0312387 A1* | 12/2011 | Heo et al. | 455/566 |
| 2012/0084692 A1* | 4/2012 | Bae | 715/769 |
| 2012/0139877 A1* | 6/2012 | Kawabe et al. | 345/175 |
| 2015/0042596 A1* | 2/2015 | Chang et al. | 345/174 |

FOREIGN PATENT DOCUMENTS

| | | |
|---|---|---|
| KR | 10-2012-0092607 A | 8/2012 |
| WO | WO 2011/055498 A1 | 5/2011 |

* cited by examiner

TOUCH SENSING SYSTEM AND METHOD FOR PROVIDING PROXIMITY SENSING FUNCTION USING TOUCH SCREEN PANEL

CROSS-REFERENCE TO RELATED APPLICATION

This application claims the priority benefit of Korean Patent Application No. 10-2013-0164084, filed on Dec. 26, 2013, in the Korean Intellectual Property Office, the disclosure of which is incorporated herein by reference.

BACKGROUND

1. Field of the Invention

The following embodiments relate to a touch sensing system and method for providing a proximity sensing function using a touch screen panel.

2. Description of the Related Art

A proximity sensor refers to a kind of a location sensor or a displacement sensor and is also referred to as a sensor configured to detect a location of an object when the object is proximately approaching.

FIG. 1 is a diagram illustrating an example of a device 100 including a proximity sensor according to a related art. The device 100 of FIG. 1 including the proximity sensor may be, for example, a smart phone. Referring to FIG. 1, the device 100 includes, as a portion of constituent elements, a screen 110 representing a touch screen, an infrared (IR) sensor 120 representing the proximity sensor, and a flexible printed circuit board (FPCB) 130 connected to the IR sensor 120. For example, the device 100 such as the smart phone may detect proximity of an object using the IR sensor 120, and may provide a variety of functions based on the circumstances. When the IR sensor 120 detects the proximity of the object in a call mode, the device 100 may provide a function of preventing an input via the screen 110.

In the related art, a space for a proximity sensor needs to be secured within a device that is to use the proximity sensor. Accordingly, a size of the device may be limited by the space used to use the proximity sensor. In addition, a predetermined amount of power may be additionally consumed to use a separate sensor.

SUMMARY

An aspect of the present invention provides a touch sensing system and method that may provide a proximity sensing function using a touch screen panel without a need to use a separate proximity sensor.

According to an aspect of the present invention, there is provided a touch sensing system, including at least one storage unit including at least one program, a touch screen configured to detect a touch of an object, and at least one processor configured to activate a proximity sensing function on the touch screen according to a control of the at least one program, to detect proximity of the object based on sensing information of a proximity sensing area predetermined on a partial area of the touch screen, and to process a predetermined operation in response to detecting the proximity of the object.

The at least one processor may be configured to detect the proximity of the object when an object having a predetermined size or more is detected through the proximity sensing area.

The at least one processor may be configured to detect proximity of an object having a predetermined size or more, based on an intensity value at each of groups and an average intensity value, wherein sensing units of the proximity sensing area are classified into the groups.

The at least one processor may be configured to detect the proximity of the object having the predetermined size or more when a strength corresponding to a difference value between a maximum intensity value and the average intensity value among intensity values is less than or equal to a predetermined first value and the number of continuous groups having an intensity value greater than the average intensity value is greater than or equal to a predetermined second value.

The at least one processor may be configured to recognize a detection of a touch of an object having a predetermined size or as an occurrence of proximity of the object, and to process the predetermined operation when the proximity sensing function is activated and the touch of the object having the predetermined size or more is detected.

The predetermined operation may include an operation of turning off a backlight of the touch screen or ignoring a touch occurring on the touch screen until a detection of the proximity of the object is cancelled.

The at least one processor may be configured to inactivate the proximity sensing function in response to detecting a touch by an object having a predetermined size or less on the touch screen, prior to detecting the proximity of the object.

According to another aspect of the present invention, there is provided a touch sensing method performed by a touch sensing system including a touch screen, the method including activating a proximity sensing function on the touch screen, detecting proximity of an object based on sensing information of a proximity sensing area predetermined on a partial area of the touch screen in response to activating the proximity sensing function, and processing a predetermined operation in response to detecting the proximity of the object.

According to embodiments of the present invention, although a separate proximity sensor is not used, a proximity sensing function using a touch screen panel may be provided.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
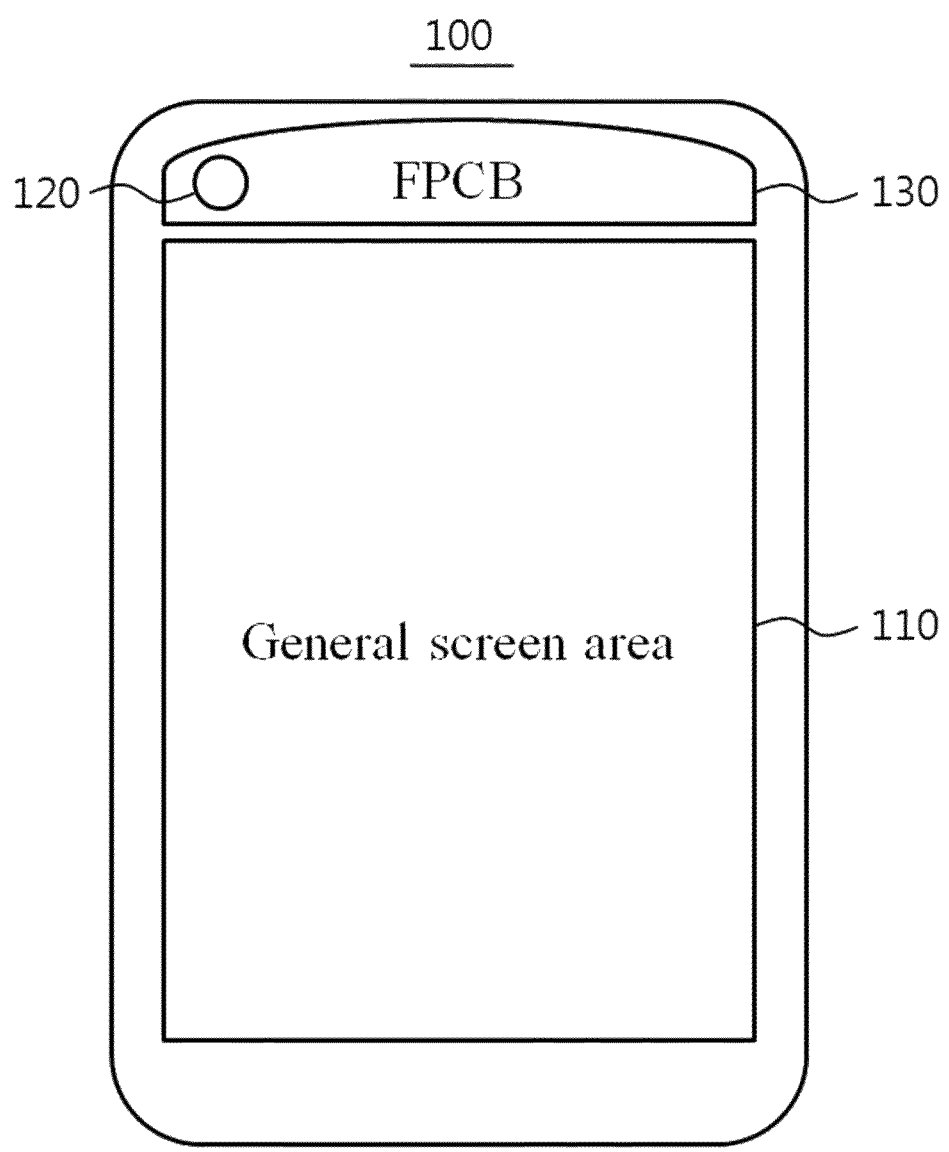
FIG. 1 is a diagram illustrating an example of a device including a proximity sensor according to a related art.

Reference will now be made in detail to exemplary embodiments of the present invention, examples of which are illustrated in the accompanying drawings. Exemplary embodiments are described below to explain the present invention by referring to the figures.

Advantages and features of the present invention and a method to achieve the same will be clearly understood from embodiments to be described by referring to the accompanying drawings. However, the present invention is not limited to the embodiments disclosed herein and may be configured in various forms. The embodiments are provided to supplement the disclosure of the present invention and to fully inform those skilled in the art about the scope of the invention. The present invention will be defined by the claims and their equivalents. Like reference numerals refer to like elements throughout. Sizes and relative sizes of layers and areas in the drawings may be exaggerated for the clarity of the description.

Hereinafter, embodiments of the present invention will be described with reference to the accompanying drawings.

Figure 2:
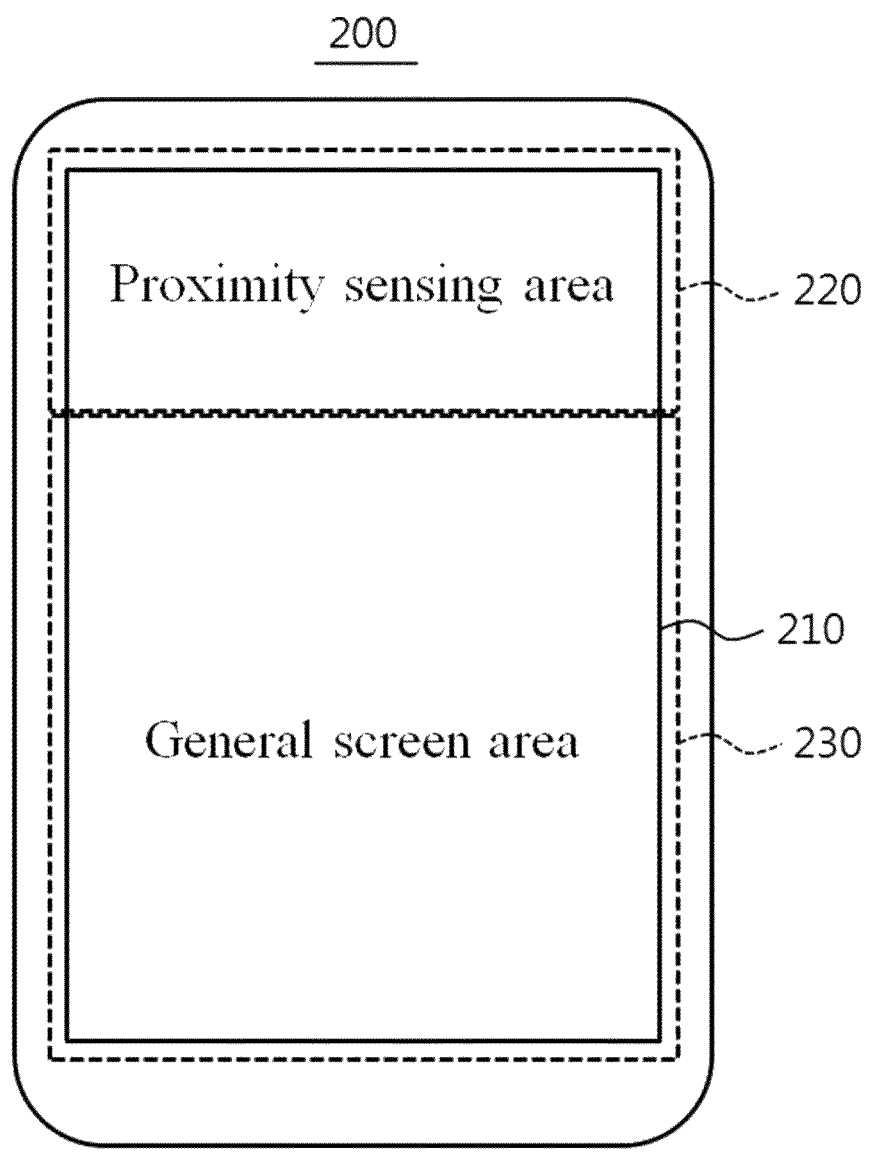
FIG. 2 is a diagram illustrating an example of a device according to an embodiment of the present invention.

FIG. 2 is a diagram illustrating an example of a device 200 according to an embodiment of the present invention. The device 200 of FIG. 2 may be, for example, a smart phone. Referring to FIG. 2, the device 200 may include a touch screen 210 as a portion of constituent elements. The touch screen 210 according to an embodiment of the present invention may be divided into a proximity sensing area that is an area of the touch screen 210 included in a first box 220 indicated by a dotted line and a general screen area that is an area of the touch screen 210 included in a second box 230 indicated by a dotted line. That is, the proximity sensing area may share a partial area of the touch screen 210.

Thus, according to an embodiment of the present invention, although a separate proximity sensor is not provided, proximity of an object may be detected through the proximity sensing area. For example, in a call mode, a face, for example, a cheek of a user being proximate to the device 200 may be detected through the proximity sensing area 220.

In the present embodiment, the proximity sensing area 220 may share the touch screen 210 by distinguishing proximity of a relatively narrow object, such as a finger, from proximity of a relatively wide object such as a cheek.

Figure 3A:
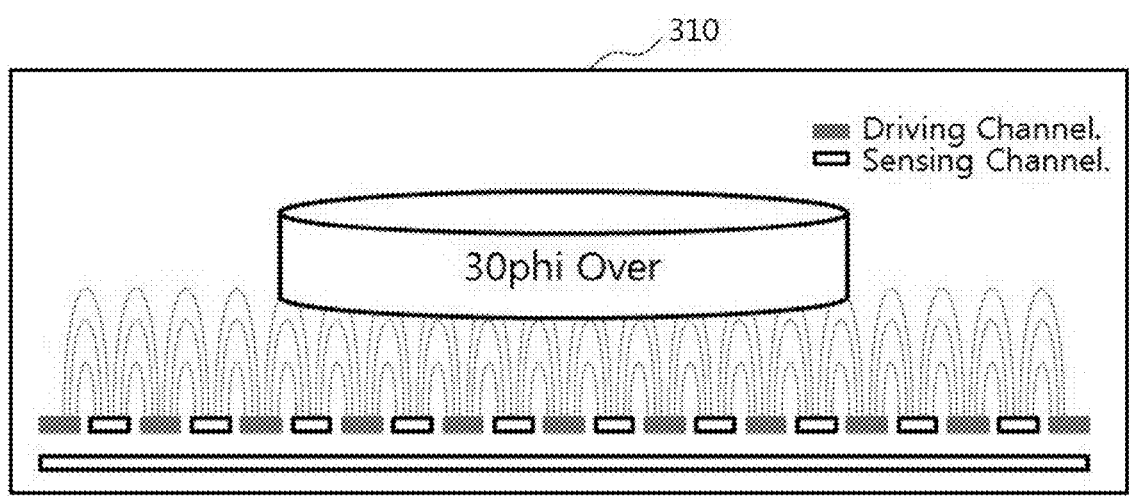
FIGS. 3A and 3B illustrate examples of differently sized objects approaching a touch screen according to an embodiment of the present invention.
Figure 3B:
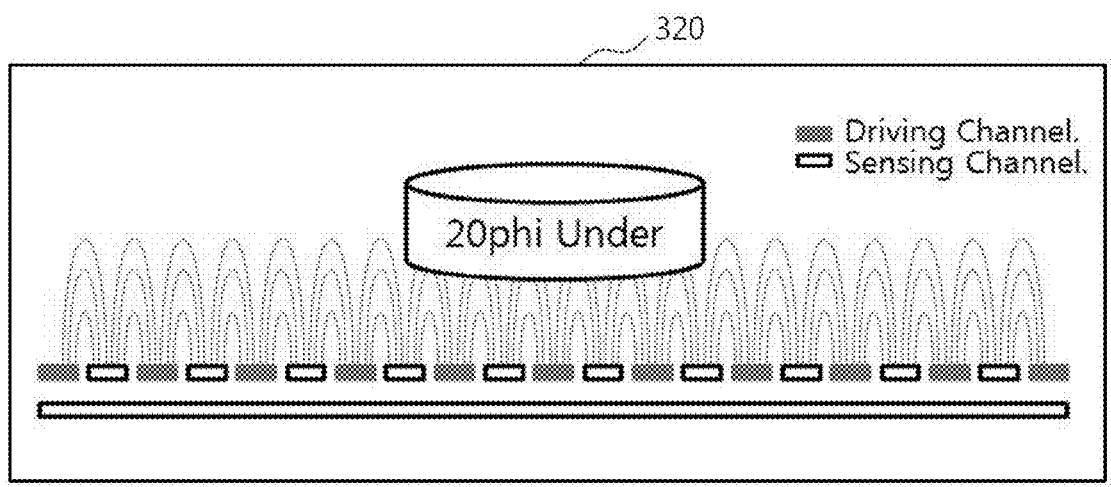

FIGS. 3A and 3B illustrate examples of differently sized objects approaching a touch screen 210 according to an embodiment of the present invention. Referring to a first box 310 indicated by a solid line, an object having a size greater than or equal to a circle of 30 phi (mm$^2$) is approaching a touch screen 210. The term 'phi' is the ratio of the circumference of a circle to its diameter.

Referring to a second box 320 indicated by a solid line, an object having a size less than or equal to a circle of 20 phi (mm$^2$) is approaching a touch screen 210. Here, a touch sensing system and method according to an embodiment of the present invention may determine whether to provide a proximity sensing function based on an intensity of recognition by a size of an object approaching a proximity sensing area 220. For example, in a call mode, the touch sensing system may turn off a proximity sensing function by determining, as a proximity or a touch for a general touch (hereinafter, a finger touch), proximity of an object having a first size, for example, the circle of 20 phi of FIG. 3B, or less on the proximity sensing area 220 or a touch of the object having the first size, for example, the circle of 20 phi, or less on the proximity sensing area 220. As another example, in a call mode, the touch sensing system may perform an operation corresponding to a proximity sensing function by determining, as proximity sensing, proximity of an object having a second size, for example, the circle of 30 phi of FIG. 3A, or more on the proximity sensing area. As still another example, the touch sensing system may determine, as proximity sensing, a touch of the object having the second size, for example, the circle of 30 phi, or more on the touch screen 210.

Hereinafter, scenarios for determining whether to use a proximity sensing function will be described.

According to Scenario 1, a touch sensing system may activate a proximity sensing function. Here, in a case in which a finger touch is detected on a touch screen 210 in a state in which proximity of an object is not detected through a proximity sensing area 220, the touch sensing system may turn off the proximity sensing function. In response to the finger no longer touching the touch screen 210, the touch sensing system may resume the proximity sensing function. For example, when the proximity sensing function is required, such as in a call mode, the touch sensing system may activate the proximity sensing function. In this example, detecting the finger touch may be determined that a user is conducting an action of manipulating a keypad on the touch screen 210 or the like. In this case, the touch sensing system may turn off the proximity sensing function in order not to obstruct the user from performing a general touch action through the entire touch screen. In response to the finger no longer touching the touch screen 210, the touch sensing system may resume the proximity sensing function for a call mode and thereby start to detect proximity of the object through the proximity sensing area.

According to Scenario 2, a touch sensing system may activate a proximity sensing function. Here, in a case in which proximity of an object is detected through a proximity sensing area 220 in a state in which a finger touch is not detected on a touch screen 210, the touch sensing system may perform a predetermined operation based on detected proximity sensing information. For example, the touch sensing system may turn off a backlight and thereby prevent a malfunction from occurring due to an undesired touch during a call. When an object is separate away from the touch screen 210 and thus, proximity of the object is not detected anymore, the touch sensing system may turn on the backlight to be returned to a state in which touch recognition is possible.

According to Scenario 3, a touch sensing system may activate a proximity sensing function. Here, although proximity of an object is not detected, the touch sensing apparatus may recognize a detection of a touch of an object having a predetermined size or more, such as a palm touch, as a detection of the proximity of the object. For example, in a call mode, a cheek of a user may approach a general screen area 230 that is a remaining area of a touch screen 210, instead of approaching a proximity sensing area 220. In this case, the touch sensing system may not detect the proximity of the object, but, may need to provide an operation corresponding to the proximity sensing. Accordingly, in a case in which a touch of the object having the predetermined size such as a palm touch is detected on the touch screen 210 in a state in which the touch sensing function is activated, the touch sensing system may recognize the detected touch of the object as if the proximity of the object is detected although the proximity of the object is not particularly detected. For example, in response to an occurrence of a palm touch in a state in which the proximity sensing function is activated, the touch sensing system may turn off a backlight of the touch screen 210. Also, the touch sensing system may recognize the palm no longer touching the touch screen 210 as if the proximity of the object is not detected anymore. In this case, the touch sensing system may turn on the backlight of the touch screen 210 again.

Hereinafter, an example of distinguishing proximity of an object for a finger touch from proximity of an object having a predetermined size or more such as a cheek and thereby detecting the proximity of the object on a proximity sensing area will be described with reference to FIGS. 4 through 6.

Figure 4:
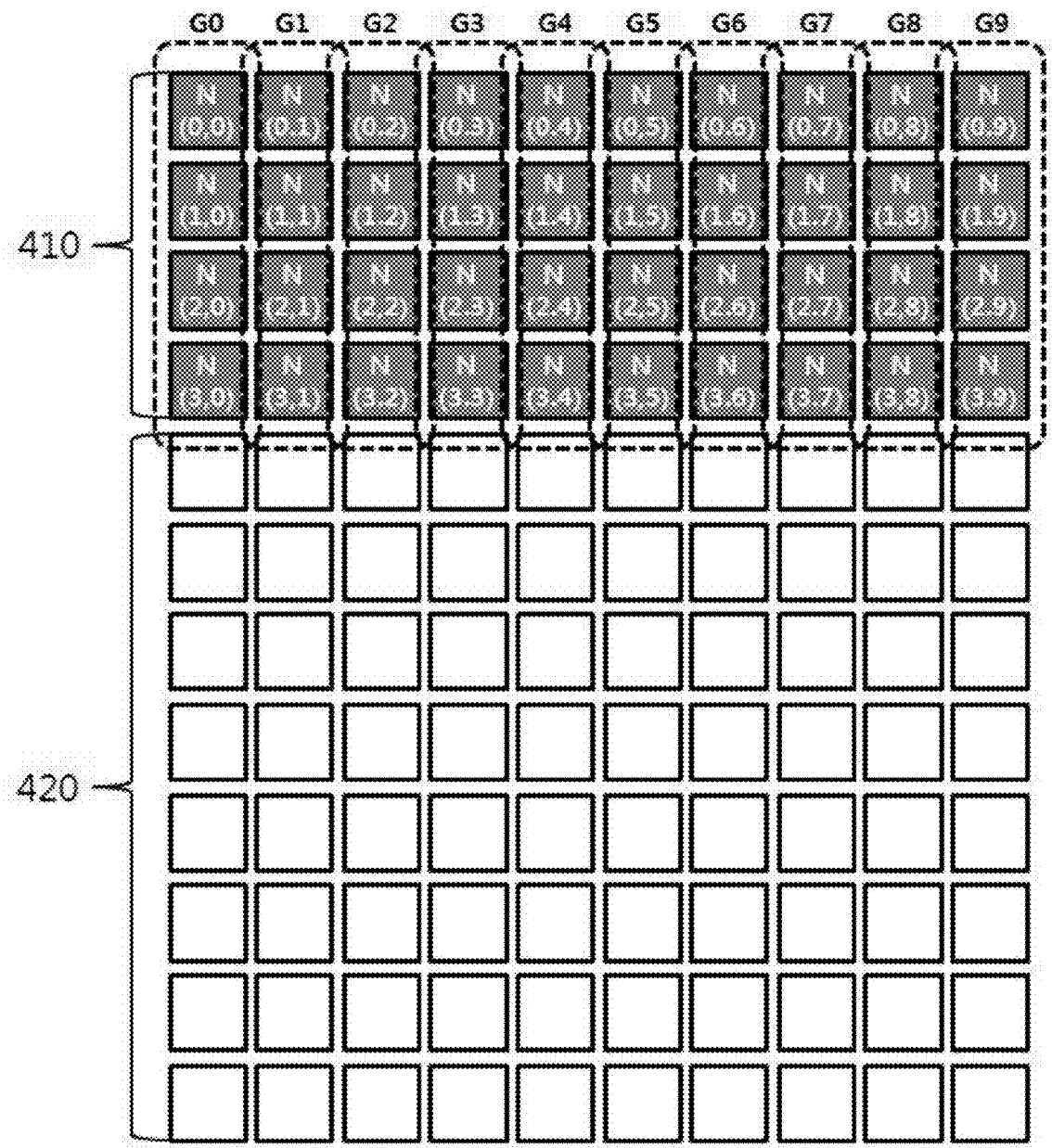
FIG. 4 is a diagram illustrating an example of a sensing unit of a touch screen according to an embodiment of the present invention.

FIG. 4 is a diagram illustrating an example of a sensing unit of a touch screen 210 according to an embodiment of the present invention. A single sensing unit may correspond to single coordinates at which an object is recognized on the touch screen. Referring to FIG. 4, a total of 120 sensing units are provided as an example. Here, it is assumed that 40 sensing units of an upper end 410 are sensing units included in a proximity sensing area described with reference to FIGS. 2 and 80 sensing units of a lower end 420 are sensing units included in a general sensing unit described with reference to FIG. 2. Also, Gn may represent a group of sensing units N(0, n), N(1, n), . . . , and N(m, n) as indicated by dotted lines, respectively. In FIG. 4, m denotes "3".

Figure 5:
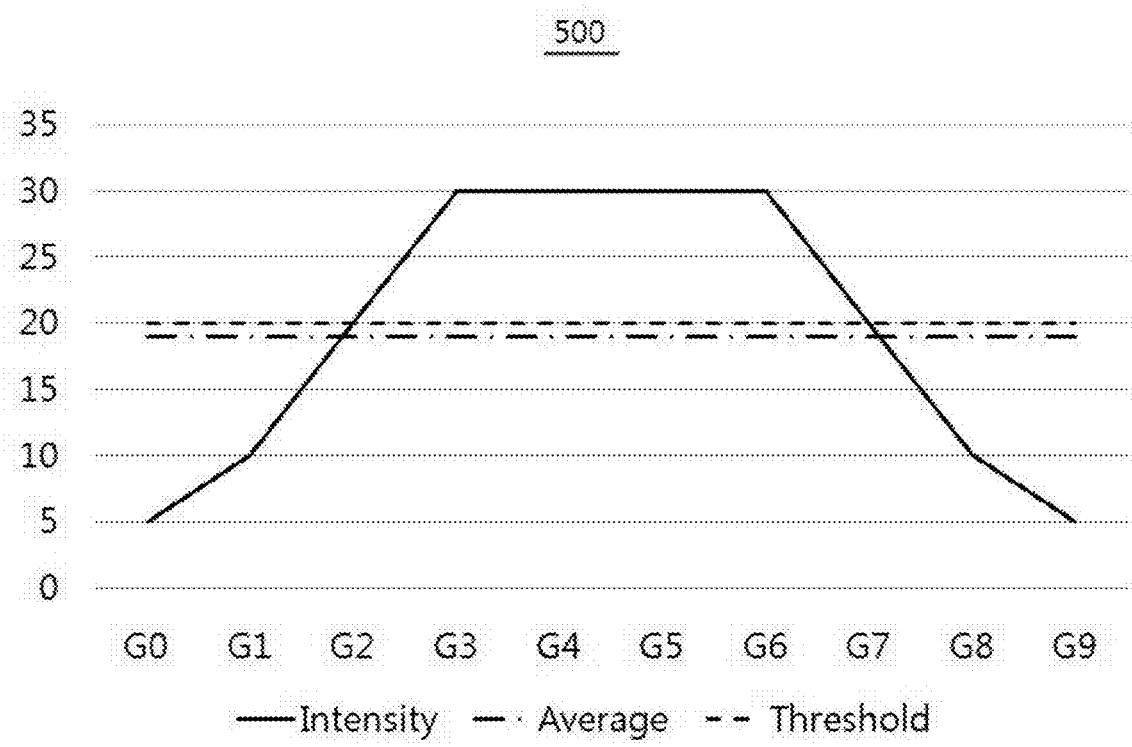
FIGS. 5 and 6 are graphs illustrating a group-by-group intensity recognized against objects having different sizes according to an embodiment of the present invention.
Figure 6:
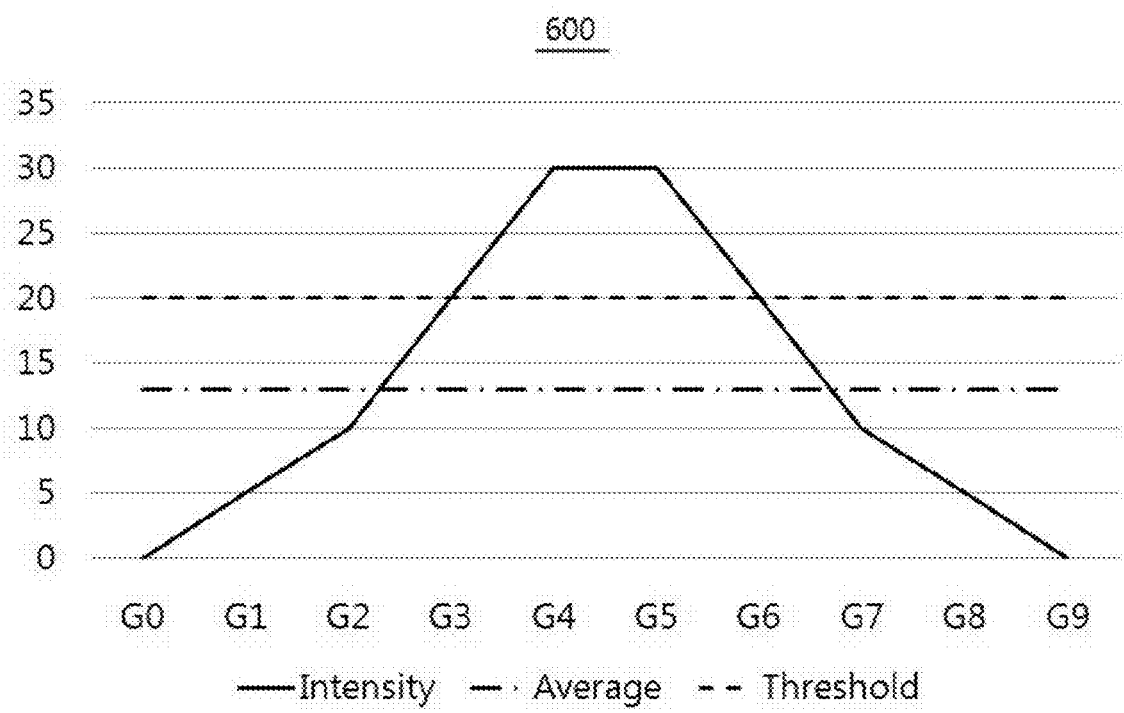

FIGS. 5 and 6 are graphs 500 and 600 illustrating a group-by-group intensity recognized against objects having different sizes according to an embodiment of the present invention. In each of the graphs 500 and 600, the x axis denotes groups of sensing units from FIG. 4 and the y axis denotes the intensity of recognition. Also, in each of the graphs 500 and 600, a solid line representing "intensity" may denote an intensity value of each group. A dotted line representing a "threshold" may denote a value preset based on the proximity sensing. An alternated long and short dash line representing an "average" may denote an average intensity value of the entire group. The group 500 of FIG. 5 shows that a relatively wide object is proximate to the proximity sensing area 220 of FIG. 2, compared to the graph 600 of FIG. 6.

A touch sensing system and method according to an embodiment of the present invention may use the following factors to distinguish proximity of a finger from proximity of a cheek.

Factor 1, "strength", denotes a difference value between a maximum intensity value and an average intensity value among intensity values of a group.

Factor 2, "number of continuous groups", denotes the number of continuous groups having an intensity value greater than or equal to the average intensity value.

A level of intensity recognized on the touch screen is limited. In contrast, when a relatively wide object is recognized, the number of groups having great intensity increases and thus, the average intensity value also relatively increases. Accordingly, a strength value decreases according to an increase in a size of an object recognized. For example, referring to the graph 500, when a maximum intensity value of a group is "30" and an average intensity value of the group is "19", the strength may have a value of "11". Also, referring to the graph 600, when a maximum intensity value of a group is "30" and an average intensity value of the group is "13", the strength may have a value of "17".

Further, when a relatively wide object is recognized on the touch screen 210, the number of continuous groups having an intensity value greater than the average intensity value relatively increases. For example, the number of continuous groups in the graph 500 is "6" and the number of continuous groups in the graph 600 is "4".

A touch sensing system and method according to an embodiment of the present invention may employ conditions as follows:

Condition 1 refers to a condition in which the number of continuous groups is greater than or equal to a predetermined number.

Condition 2 refers to a condition in which the strength is less than or equal to a predetermined value.

For example, the touch sensing system and method may recognize a detection of a touch on a proximity sensing area, which satisfies all of Condition 1 and Condition 2, as a detection of proximity of an object, that is, an occurrence of a proximity sensing.

Figure 7:
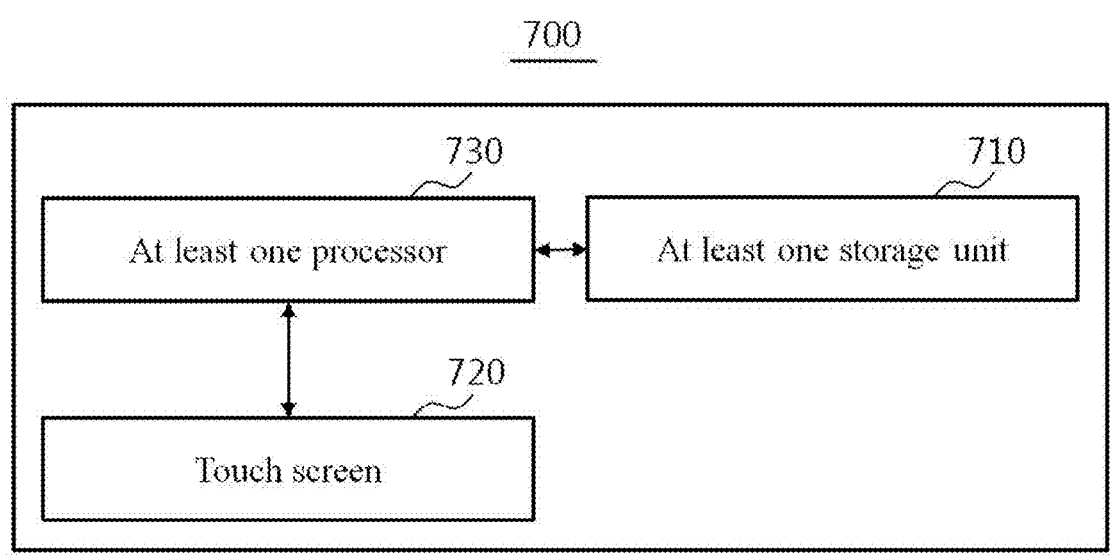
FIG. 7 is a block diagram illustrating an internal configuration of a touch sensing system according to an embodiment of the present invention.
Figure 8:
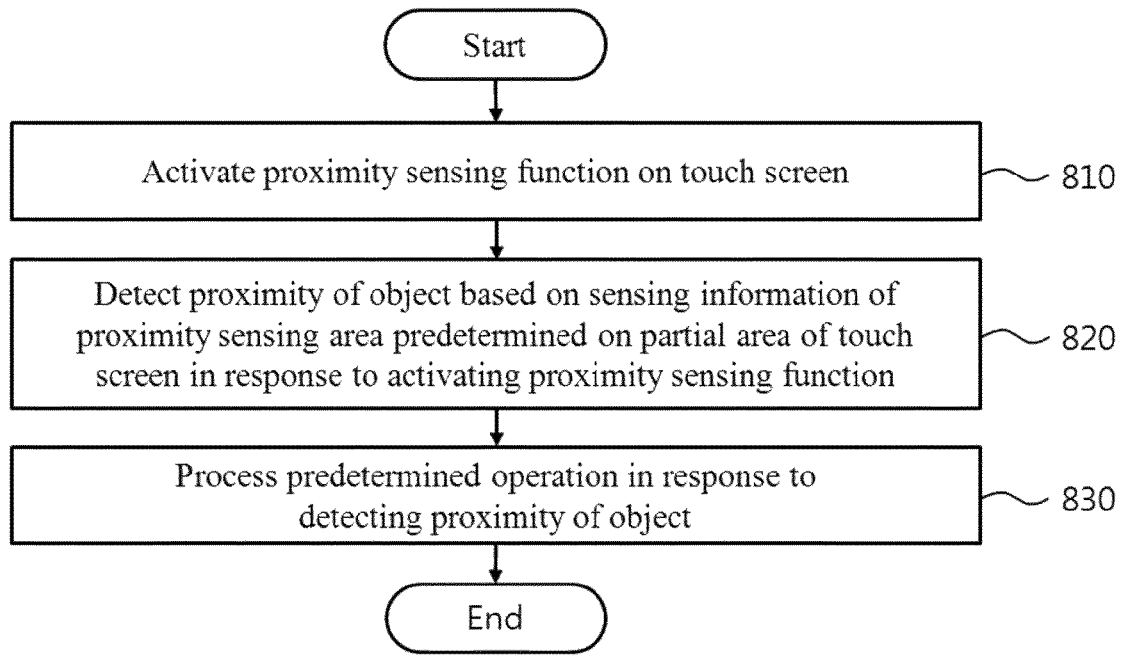
FIG. 8 is a flowchart illustrating a touch sensing method according to an embodiment of the present invention.

FIG. 7 is a block diagram illustrating an internal configuration of a touch sensing system 700 according to an embodiment of the present invention, and FIG. 8 is a flowchart illustrating a touch sensing method according to an embodiment of the present invention.

Referring to FIG. 7, the touch sensing system 700 according to the present embodiment may include at least one storage unit 710 (i.e., a non-transitory computer-readable storage medium) including at least one program, a touch screen 720 configured to detect a touch of an object, and at least one processor 730 configured to operate according to a control of the at least one program. The at least one program may refer to a program installed in the touch sensing system 700 in order to control an operation of the touch sensing system 700. The program may be stored in the at least one storage unit 710 upon a production of the touch sensing system 700, or may be stored in the at least one storage unit 710 through an installation using a separate file. For example, the touch sensing system 700 may further include a communication unit (not shown) configured to communicate with an external device, and may connect to a file distribution system (not shown) configured to distribute the file through the communication unit. The file distribution system may include a file storage (not shown) configured to store a file and a file transmitter (not shown) configured to transmit the file. The touch sensing system 700 may receive a file from the file distribution system, and may obtain a required program through an installation using the received file.

In this instance, the touch sensing system 700 may perform a touch sensing method according to an embodiment of the present invention. For example, operations included in the touch sensing method may be performed by the touch sensing system 700 or the at least one processor 730 included in the touch sensing system 700. An embodiment in which the touch sensing system 700 performs operations included in the touch sensing method will be described with reference to FIG. 8.

In operation 810, the touch sensing system 700 may activate a proximity sensing function on a touch screen. The proximity sensing function is described above and thus, a repeated description is omitted.

In operation 820, in response to activating the proximity sensing function, the touch sensing system 700 may detect proximity of an object based on sensing information of a proximity sensing area predetermined on a partial area of the touch screen.

In operation 830, the touch sensing system 700 may process a predetermined operation in response to detecting the proximity of the object.

Operations 810 through 830 are describing basic operations of the touch sensing method, such as detecting the proximity of the object using the proximity sensing area and processing an operation corresponding to the detection of the proximity and thus, may be further embodied through a variety of embodiments.

According to another embodiment, when an object having a predetermined size or more is detected through the proximity sensing area, the touch sensing system 700 may detect the proximity of the object in operation 820. For example, the touch sensing system 700 may regard, as not proximity for proximity sensing but proximity for a general touch, proximity of an object having a predetermined size or less.

According to another embodiment, in operation 820, the touch sensing system 700 may detect proximity of an object having a predetermined size or more, based on an intensity value at which each of groups into which sensing units of the proximity sensing area are classified has recognized the object, and an average intensity value. For example, when a strength corresponding to a difference value between a maximum intensity value and the average intensity value among intensity values is less than or equal to a predetermined first value and the number of continuous groups having an intensity value greater than the average intensity value is greater than or equal to a predetermined second value, the touch sensing system 700 may detect the proximity of the object having the predetermined size or more. The embodiments are described above with reference to FIGS. 4 through 6.

According to another embodiment, when the proximity sensing function is activated and a touch of an object having a predetermined size or more is detected, the touch sensing system 700 may recognize a detection of the object having the predetermined size or more as an occurrence of proximity of the object in operation 820. An embodiment in which a touch of an object having a predetermined size or more, such as a palm touch, is detected as proximity of the object is described in Scenario 3.

According to another embodiment, the predetermined operation may include an operation of turning off a backlight of the touch screen or ignoring a touch occurring on the touch screen until a detection of the proximity of the object is cancelled. For example, in response to detecting proximity of a cheek of a user in a call mode, the touch sensing system 700 may prevent a malfunction from occurring due to an undesired touch by turning off a backlight of the touch screen or ignoring a touch occurring on the touch screen.

According to another embodiment, although not illustrated, the touch sensing method may further include inactivating the proximity sensing function in response to detecting a touch by an object having a predetermined size or less on the touch screen, prior to detecting the proximity of the object, in addition to operations 810 through 830. This operation may be included between operations 810 and 820 and thereby performed.

As described above, according to embodiments of the present invention, it is possible to provide a proximity sensing function using a touch screen panel without a need to use a separate proximity sensor.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A touch sensing system, comprising:
    at least one storage unit comprising at least one program;
    a touch screen configured to detect a touch of an object; and
    at least one processor configured to activate a proximity sensing function on the touch screen according to a control of the at least one program, to detect proximity of the object based on sensing information of a proximity sensing area predetermined on a partial area of the touch screen, and to process a predetermined operation in response to detecting the proximity of the object,
    wherein the at least one processor is configured to detect proximity of the object having a predetermined size or more, based on an intensity value at each group of sensing units of the proximity sensing area and an average intensity value, wherein the sensing units of the proximity sensing area are classified into groups.

2. The touch sensing system of claim 1, wherein the at least one processor is configured to detect the proximity of the object when the object having the predetermined size or more is detected through the proximity sensing area.

3. The touch sensing system of claim 1, wherein the at least one processor is configured to detect the proximity of the object having the predetermined size or more when a strength corresponding to a difference value between a maximum intensity value and the average intensity value among intensity values is less than or equal to a predetermined first value and the number of continuous groups having an intensity value greater than the average intensity value is greater than or equal to a predetermined second value.

4. The touch sensing system of claim 1, wherein the at least one processor is configured to recognize a detection of a touch of the object having the predetermined size or more as an occurrence of proximity of the object, and to process the predetermined operation when the proximity sensing function is activated and the touch of the object having the predetermined size or more is detected.

5. The touch sensing system of claim 1, wherein the predetermined operation comprises an operation of turning off a backlight of the touch screen or ignoring a touch occurring on the touch screen until a detection of the proximity of the object is cancelled.

6. The touch sensing system of claim 1, wherein the at least one processor is configured to inactivate the proximity sensing function in response to detecting a touch by the object having the predetermined size or less on the touch screen, prior to detecting the proximity of the object.

7. A touch sensing method performed by a touch sensing system comprising a touch screen, the method comprising:
    activating a proximity sensing function on the touch screen;
    detecting proximity of an object based on sensing information of a proximity sensing area predetermined on a partial area of the touch screen in response to activating the proximity sensing function; and
    processing a predetermined operation in response to detecting the proximity of the object,
    wherein the detecting comprises detecting proximity of the object having a predetermined size or more, based on an intensity value at each group of sensing units of the proximity sensing area that are classified as having recognized the object, and an average intensity value.

8. The method of claim 7, wherein the detecting comprises detecting the proximity of the object when the object having a predetermined size or more is detected through the proximity sensing area.

9. The method of claim 7, wherein the detecting comprises detecting the proximity of the object having the predetermined size or more when a strength corresponding to a difference value between a maximum intensity value and the average intensity value among intensity values is less than or equal to a predetermined first value and the number of continuous groups having an intensity value greater than the average intensity value is greater than or equal to a predetermined second value.

10. The method of claim 7, wherein the detecting comprises recognizing a detection of a touch of the object having the predetermined size or more as an occurrence of proximity of the object when the proximity sensing function is activated and the touch of the object having the predetermined size or more is detected.

11. The method of claim 7, wherein the predetermined operation comprises an operation of turning off a backlight of the touch screen or ignoring a touch occurring on the touch screen until a detection of the proximity of the object is cancelled.

12. The method of claim 7, further comprising:
inactivating the proximity sensing function in response to detecting a touch by then object having the predetermined size or less on the touch screen, prior to detecting the proximity of the object.

* * * * *